United States Patent
Watanabe (10) Patent No.: US 7,298,709 B2
(45) Date of Patent: Nov. 20, 2007

(54) NETWORK TRANSFER COMMUNICATION DEVICE, COMMUNICATION SYSTEM, TRANSFER COMMUNICATION METHOD OF ELECTRONIC INFORMATION AND ITS PROGRAM

(75) Inventor: Yuichi Watanabe, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1089 days.

(21) Appl. No.: 10/231,221

(22) Filed: Aug. 29, 2002

(65) Prior Publication Data

US 2003/0043743 A1 Mar. 6, 2003

(30) Foreign Application Priority Data

Aug. 29, 2001 (JP) ............................. 2001-259227

(51) Int. Cl.
*H04L 12/28* (2006.01)
(52) U.S. Cl. ...................... 370/254; 709/225
(58) Field of Classification Search ............... None
See application file for complete search history.

(56) References Cited

U.S. PATENT DOCUMENTS 6,138,149 A * 10/2000 Ohmura ............... 709/218
6,731,625 B1 * 5/2004 Eastep et al. ............... 370/352
6,879,995 B1 * 4/2005 Chinta et al. ............... 709/204
7,085,834 B2 * 8/2006 Delany et al. .............. 709/225
7,092,370 B2 * 8/2006 Jiang et al. ................ 370/329

FOREIGN PATENT DOCUMENTS

| JP | 63-178637 A | 7/1988 |
| JP | 11-127191 A | 5/1999 |
| JP | 11-187235 | 7/1999 |
| JP | 11-298520 | 10/1999 |

* cited by examiner

*Primary Examiner*—Phirin Sam
(74) *Attorney, Agent, or Firm*—Akin Gump Strauss Hauer & Feld LLP

(57) ABSTRACT

A network transfer communication device (6A) or (6B) transfers electronic information from the communication terminal (3) to the communication terminal (5). A destination information abstracter 30 abstracts communication condition information from the transfer request information received from the communication terminal (5). A transfer controller (29) sets communication condition according to the information abstracted by the destination information abstracter (30). A mail server access unit (28) receives the electronic information from the communication terminal (3) according to the setting condition set in the destination information abstracter (30). A transfer controller (29) executes communication control for transferring the electronic information to the communication device (5) according to the condition.

27 Claims, 8 Drawing Sheets

| | |
|---|---|
| SOURCE | yabcde@rst.com |
| SUBJECT | yu-abcdef@ghijk.co.jp |
| TEXT | yuiabcdef@rst.co.jp;ON |

NETWORK TRANSFER COMMUNICATION DEVICE, COMMUNICATION SYSTEM, TRANSFER COMMUNICATION METHOD OF ELECTRONIC INFORMATION AND ITS PROGRAM

BACKGROUND OF THE INVENTION

1. Field of the Invention

The present invention relates to a network transfer communication device which transfers electronic information in communication network, a communication system which comprises such device, a method of electronic information transfer communication and a program for transferring electronic information.

2. Description of Related Art

Today, electronic communication is becoming indispensable at every business opportunity. This kind of communication is processed in network set up over every business area. And, electronic information arrives at each site in the network. That is, a business person can get such electronic information at his or her office.

Besides, such electronic information can be transferred to any site including the client's office connecting with the business person. By the way, such electronic information is embodied in electronic mail. And, it is processed in mutual communication network (the internet) under TCP/IP (transmission control protocol/internet protocol) circumstances.

In this mutual communication network for electronic mail communication under these circumstances, there is what is called an internet service provider (ISP). ISP gives ID (connection identification) and password to each user. These are necessary for access to ISP. And, it also gives mail address and mail password. These are necessary for electronic mail communication.

In this electronic mail communication, ISP receives electronic mails in its database (D/B). And, ISP transfers electronic mails to the specific user. There are two methods for this transfer.

One is a method of transfer to a mobile terminal which installed a mailer application program which is able to process internet access. In this occasion, the user has set up destination mail address registration in advance, to get the transfer service which is provided by ISP.

The other is a method of transfer to a communication terminal borrowed at the client's office. In this occasion, the user usually has not set up destination mail address registration in advance. So, the user connects the borrowed communication terminal to ISP. And, the user takes in the electronic mail addressed to the user, to read the contents of the mail.

However, the conventional arts mentioned above have defects hereinafter described.

First, the number of destination (mail address) which is able to set up registration is limited in the transfer service. This hinders the user from utilizing this service.

Second, it is necessary for the user to set up the mail address and password of individual or corporation in the mailer application program installed in the communication terminal when the user borrows it at the client's office. In this occasion, the user may be afraid that the mail address or password leaks out owing to the setting. Because, the electronic mail information is likely to be read by someone whom the user never knows.

SUMMARY OF THE INVENTION

Therefore the present invention aimed at providing a network transfer communication device and a communication system which are capable of eliminating both of transfer destination registration limitation and transfer information leak. And, it also aimed at providing a method and a program which are capable of achieving this object.

Further, the present invention aimed at enabling the user to use facsimile when there is no communication device which is able to make electronic information communication at the client's office.

According to one aspect of the present invention, there is provided an network transfer communication device which transfers electronic information from the first communication device to the second communication device, wherein comprising next means. These means can be embodied in the embodiment shown in FIG. 2. The first is an information abstracting means (destination information abstracter 30) to abstract communication condition information from the transfer request information received from said second communication device. The second is a communication condition setting means (transfer controller 29) to set communication condition according to the information abstracted by said information abstracting means. The third is an electronic information receiving means (mail server access unit 28) to receive said electronic information from said first communication device according to the setting condition set in said communication condition setting means. And the fourth is a communication controlling means (transfer controller 29) to execute communication control for transferring said electronic information to said second communication device according to the condition set in said communication condition setting means.

Moreover there is provided a network transfer communication device according to above device wherein said electronic information is an electronic mail information, said communication condition information abstracted by said information abstracting means is an information of facsimile transmission, and said communication control processed by said communication controlling means is a communication control by facsimile transmission operation which transfers said electronic mail as facsimile data.

Further there is provided a network transfer communication system where electronic information is transferred from the first communication device to the second communication device, wherein comprising each configuration of above devices.

According to another aspect of the present invention, there is provided a transfer method for network transfer communication device which transfers electronic mail information from the first communication device to the second communication device, wherein comprising an information abstracting process for abstracting electronic mail transfer setting information from the transfer request information received from said second communication device, a communication condition setting process for setting communication condition according to the information abstracted by said information abstracting process, an electronic mail information receiving process for receiving said electronic mail information from said first communication device according to the setting condition set by said communication condition setting process and a communication controlling process for executing communication control for transferring said electronic mail information to said second communication device according to the condition set by the communication condition setting process.

Moreover there is provided a transfer method for network transfer communication device which transfers electronic mail information from the first communication device to the second communication device, wherein comprising: an information abstracting process for abstracting facsimile transmission setting information from the transfer request information received from said second communication device, a communication condition setting process for setting communication condition according to the information abstracted by said information abstracting process, an electronic mail information receiving process for receiving said electronic mail information from said first communication device according to the setting condition set by said communication condition setting process and a communication controlling process for executing communication control for transferring said electronic mail information as facsimile data to said second communication device according to the condition set by the communication condition setting process.

Further there is provided a transfer program for computer system which transfers electronic information from the first communication device to the second communication device, wherein comprising: an information abstracting process for abstracting communication condition information from the transfer request information received from said second communication device, a communication condition setting process for setting communication condition according to the information abstracted by said information abstracting process, an electronic information receiving process for receiving said electronic information from said first communication device according to the setting condition set by said communication condition setting process and a communication controlling process for executing communication control for transferring said electronic information to said second communication device according to the condition set by the communication condition setting process.

BRIEF DESCRIPTION OF THE DRAWINGS

The present invention will be understood more fully by the succeeding detailed description in conjunction with the following accompanying drawings.

DESCRIPTION OF THE PREFERRED EMBODIMENTS

The embodiments preferred by the inventor of the present invention will be now described with reference to the accompanying drawings hereinafter.

First Embodiment

<Configuration>

Figure 1:
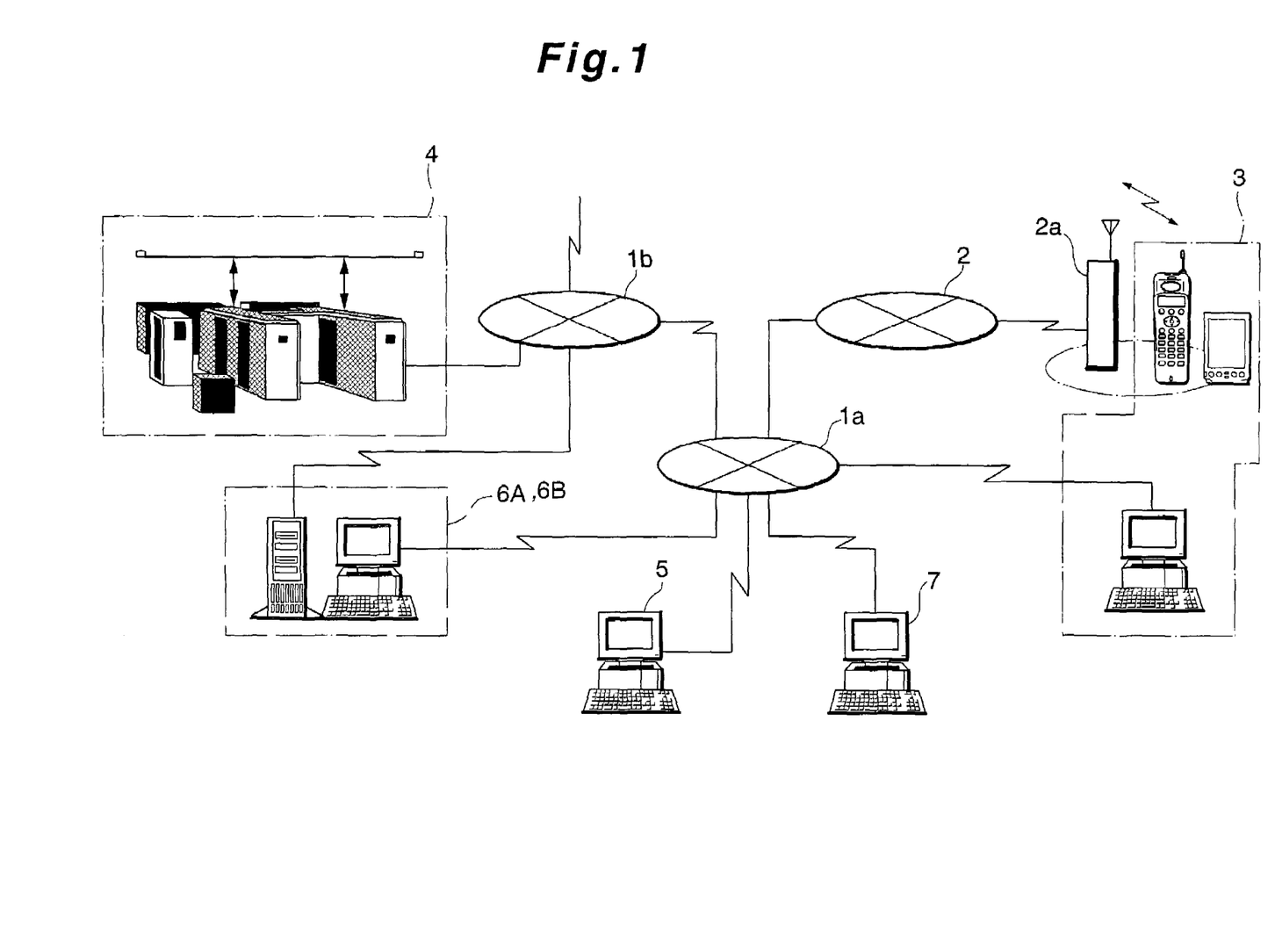
FIG. 1 is a communication network chart showing the configuration of the first embodiment according to the present invention.

Referring to FIG. 1, this example of communication network comprises of an analog fixed communication network 1a, a digital fixed communication network 1b, and a digital mobile communication network 2. (These three communication networks are gathered up occasionally to be inscribed with the name of communication network.) In the digital mobile communication network 2, there is a cell site 2a connected via wireless section (air interface) with a communication terminal 3 of an electronic mail sender (a mobile telephone, a mobile information terminal/PDA (personal digital assistant), and so on). And, in an analog fixed communication network 1a, there is also a small all-around computer connected as the communication terminal 3 which is used as an electronic mail sender.

In an analog fixed communication network 1a, there is a communication terminal 5 to be used outside by the user who receives the electronic mail from the communication terminal 3 of the sender. In an analog fixed communication network 1a, further, there is a communication terminal 7 to be used usually (not outside). This is used by the user who receives the electronic mail from the communication terminal 3 of the sender. And, there is as well a network transfer communication device 6A hereafter described in FIG. 2 wherein the present invention is embodied. Communication terminals 5, 7 is made up of a small all-around computer which installs a mailer application program and modulator/demodulator (MODEM).

In the digital fixed communication network 1b, there is a local area network (LAN) set in the network transfer communication device 6A, as well as a mail server 4 (the relaying communication device in the claim) set in the ISP and so on. The LAN will be described in the next FIG. 2.

In addition, the present invention is not limited to the configuration described in FIG. 1. The network can comprise one network of either analog fixed communication network 1a or digital fixed communication network 1b, and digital mobile communication network 2. Besides, the network can comprise only one network of either analog fixed communication network 1a or digital fixed communication network 1b, without digital mobile communication network 2. Further, in addition, gateways or content editing server and so on for the transmission form of various kind (for example multi-media transmission) are omitted in the drawings.

Next, the embodiment of the network transfer communication device 6A according to the present invention will be described hereinafter referring to FIG. 2.

Figure 2:
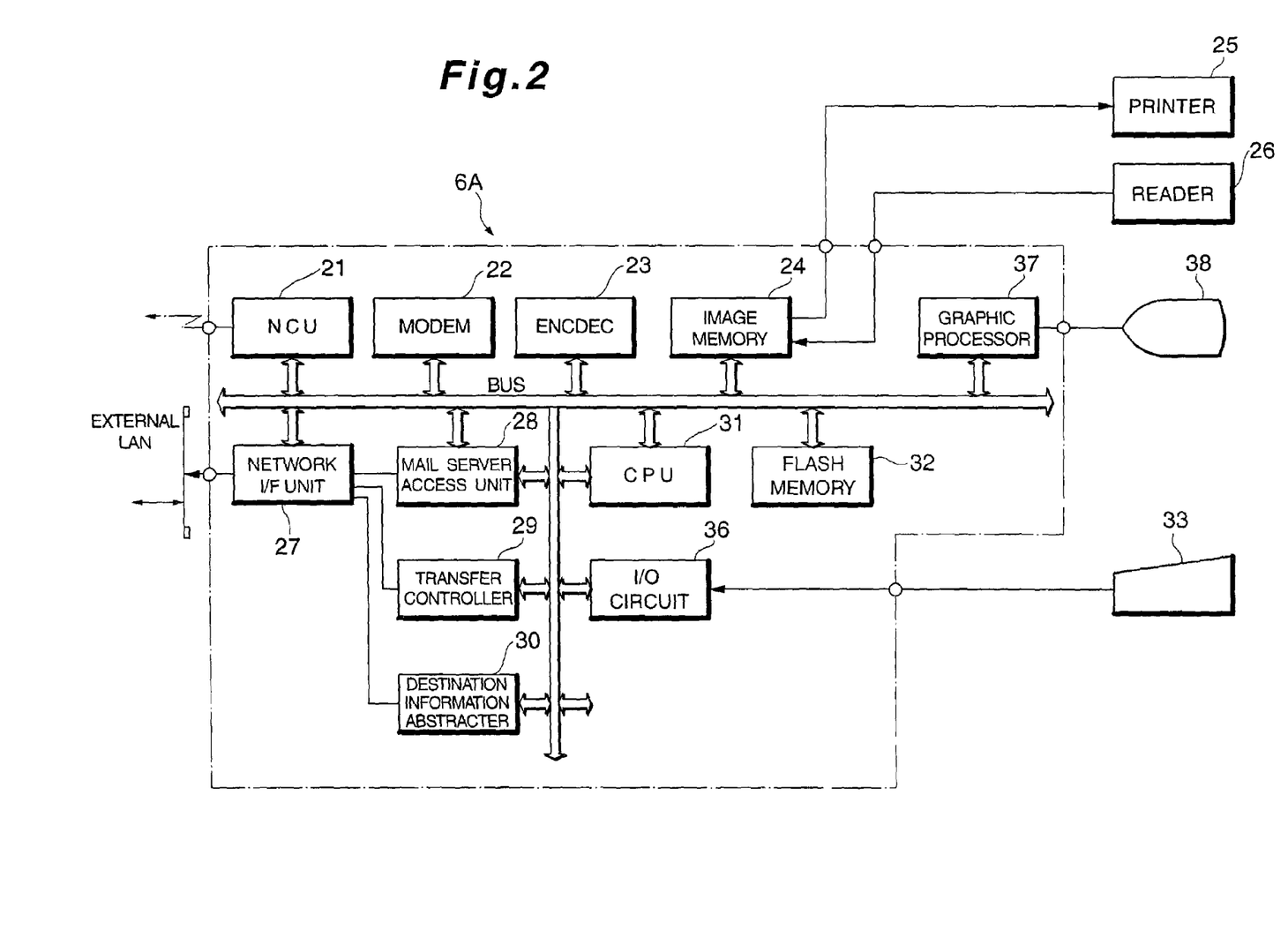
FIG. 2 is a block diagram showing the configuration of the network transfer communication device consisted in FIG. 1.

In the network transfer communication device 6A of FIG. 2, there is an NCU (network control unit) 21 and a MODEM (modulator/demodulator) 22. The NCU is connected to the analog fixed communication network 1a, so as to execute facsimile communication control in the second embodiment hereafter described. The MODEM 22 is connected to the bus line "BUS"; so as to transform data. It transforms digital data into analog data to send the data via NCU 21 to analog fixed communication network 1a. And, it transforms analog data into digital data to receive the data via NCU 21 from analog fixed communication network 1a. Further, in the network transfer communication network 6A, there are an ENCDEC 23, image memory 24 and printer 25 connected to BUS. The ENCDEC 23 encodes data to send and decodes data to receive. The image memory 24 memorizes image data either to send or to receive via facsimile. The printer 25 prints out data from the image memory 24 Moreover, in the network transfer communication network 6A, there are a reader 26, a network interface unit 27, a mail server access unit 28, a transfer controller 29 and a destination information abstracter 30. These are connected to BUS respectively. The reader 26 scans manuscripts to read their images in the image memory 24. The network interface unit 27 processes the communication protocol of electronic mails to execute both receiving (for example, POP3; post office protocol version 3) and sending (for example, SMTP: simple mail transfer protocol). The mail server access unit 28 executes controlling access to the mail server 4. The transfer controller 29 executes controlling transfer of the received electronic mail toward the destination address. The destination information abstracter 30 abstracts the destination information and the text data from the received electronic mail so as to transfer it.

Further, in the network transfer communication network 6A, there are a CPU 31, a flash memory 32, an input device 33, an I/O circuit 36, a graphic processor 37 and a display 38. CPU 31 controls each part of the network transfer communication device 6A. The flash memory 32 holds the programs to execute these controls, variables in these executions and prescribed information in the device. The input device 33 is used for inputting various kinds of information. I/O circuit 36 controls the input process of the input device 33. The graphic processor 37 processes graphic display of the processing data. The display 38 comprises a liquid crystal display (LCD) to present the processing data for the user.

The above mentioned network interface unit 27 is connected to the digital fixed communication network 1b via LAN (local area network). And, the network transfer communication device 6A processes electronic mail communication according to this embodiment of the present invention described hereafter. In addition, LAN can be connected to the analog fixed communication network 1a, so as to process electronic mail communication according to this embodiment of the present invention. In this occasion, network interface 27 and CPU 31 cooperate with each other to process electronic mail communication. NCU 21, MODEM 22 and analog fixed communication network 1a are used in this process. Moreover, DSU (digital service unit) or TA (terminal adapter) can be equipped in place of NCU 21 and MODEM 22, when the LAN is connected to the digital fixed communication network 1b.

In addition, the present invention is not limited to the embodiment described in FIG. 2 on the next point of view. The operation processed by mail server access unit 28, transfer controller 29 and destination information abstracter 30 can be processed by a program which performs this embodiment of the present invention. This program can be made up of the boot program, control program and communication program installed in working area (flash memory 32) controlled by CPU 31 and ROM (not shown in the drawings). This is also claimed in the claims.

By the way, the configuration of the mail server 4 shown in FIG. 1 is same as that of well-known one. For example, it comprises line connection device, web server, FTP(file transfer protocol)file transfer server, DNS(domain name system)server FAX/electronic mail server, database server and database device. The description of each configuration is omitted because it is known well.

The configuration of mobile telephone as one of the communication terminal 3 is also known well as PDC (personal digital cellular telecommunication system) formula, PHS (personal handy phone system) formula, (TDMA, TDD, CDMA). As for PDA or small all-around computer as another type of the communication terminal 3, their configuration and operation are also known well. So, each description is omitted. The mobile telephone, PDA and small all-around computer install application programs which can explore the internet.

Hereinafter, the communication rule of the transfer request electronic mail will be described.

Figure 3A:
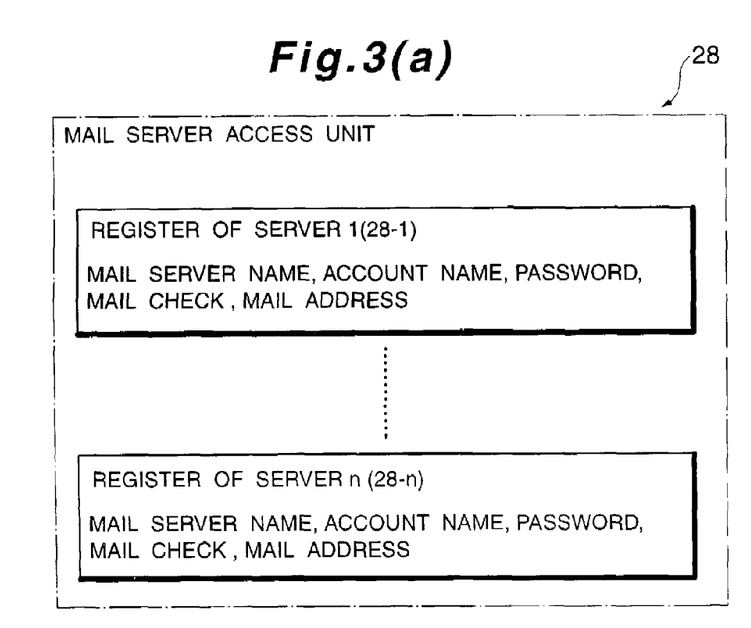
FIG. 3 is a block diagram showing the contents memorized in the mail server access unit, the transfer controller and the destination information abstracter consisted in FIG. 2.

As shown in FIG. 3(*a*), in mail server access unit 28, there is each rule of mail server 4. Each rule comprises (1)mail server name, (2)account name, (3)password, (4)mail check (ON or OFF), (5)destination mail address. These rules are memorized in areas 28-1 to 28-n respectively.

Figure 3B:
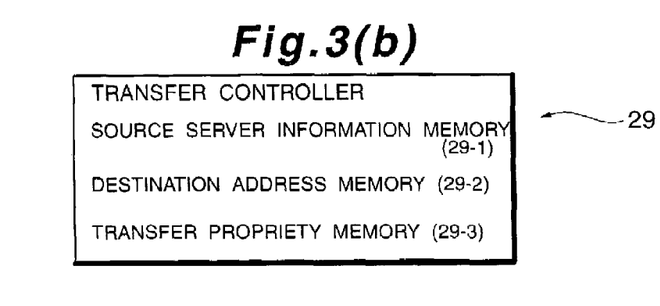

As shown in FIG. 3(*b*), transfer controller 29 has source server information memory 29-1, destination address memory 29-2, and transfer propriety memory 29-3. The source server information memory 29-1 memorizes the information for relating the mail server access unit 28 with the destination address. The destination address memory 29-2 memorizes one of the destination addresses registered in the mail server access unit 28. The transfer propriety memory 29-3 memorizes the information of the propriety of transfer.

Figure 3C:
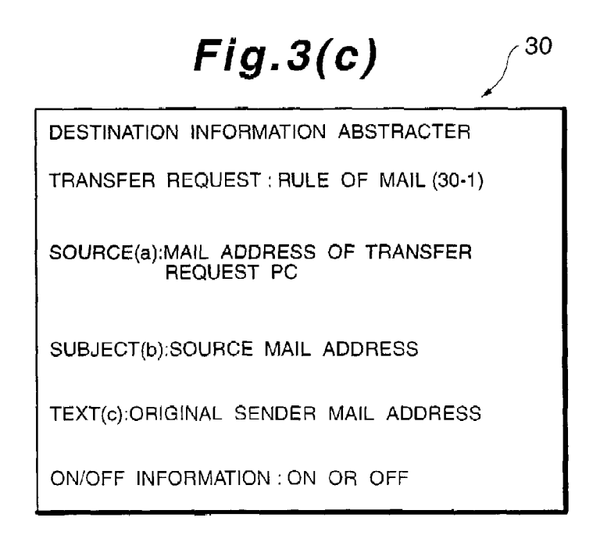

As shown in FIG. 3(*c*), destination information abstracter 30 has rule 301 of transfer request electronic mail. This rule comprises the articles of source(a), subject(b), text(c) and ON/OFF information(d). The source(a) is the mail address of the communication terminal 5. The subject(b) is the mail address of the network transfer communication device 6A. The text(c) is the mail address of the communication terminal 3. The ON/OFF information(d) indicates whether to check arrival of mail.

<Operation>

Next, the operation of the first embodiment will be described hereinafter.

(1) The Operation Relating to the Mail Server 4

Figure 4:
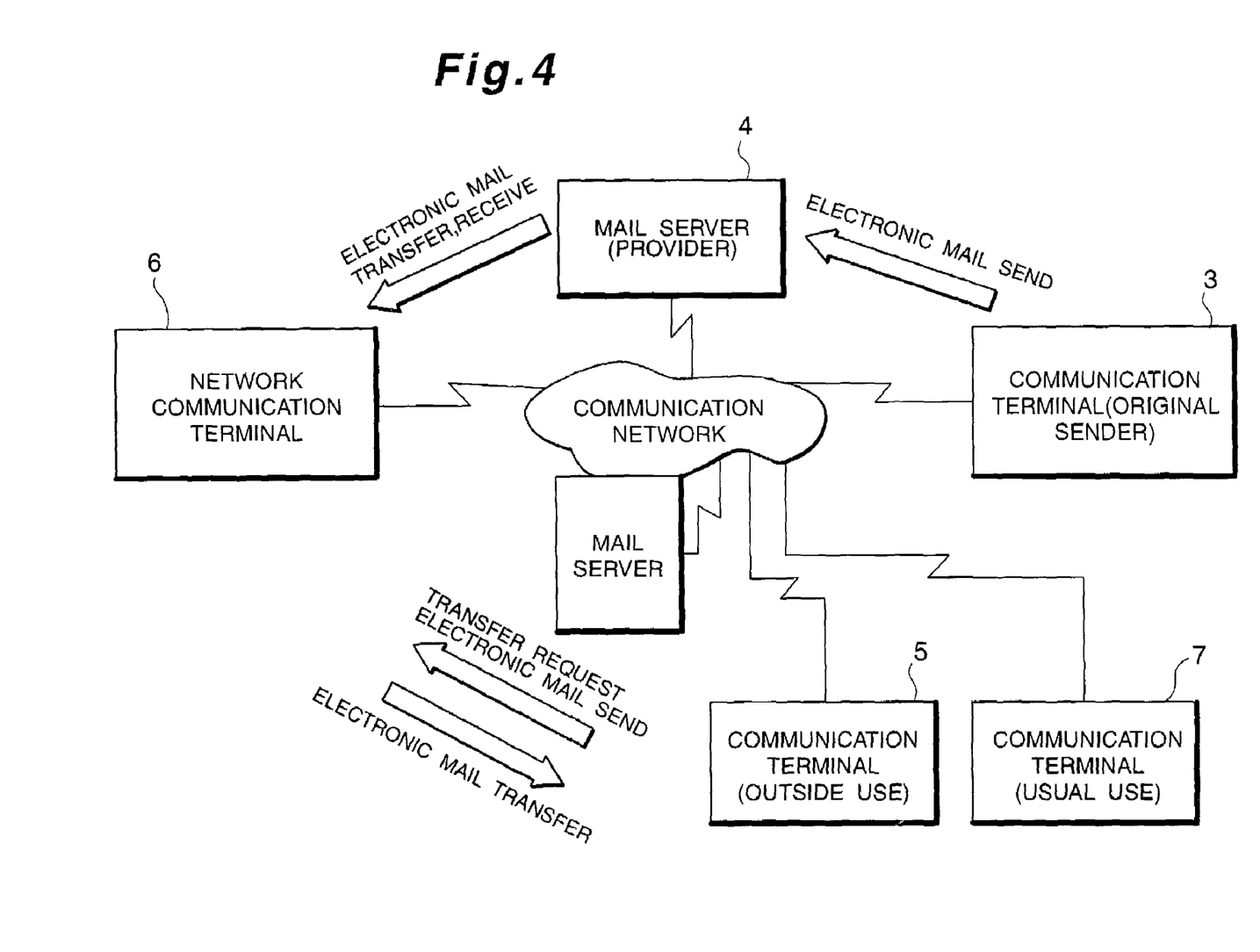
FIG. 4 is a block diagram showing the overall operation of the first embodiment.

In the mail server access unit 28 shown in FIG. 2, the user sets plural mail server information (account, mail address, password and so on) in the areas 28-1 to 28-n shown in FIG. 3(*a*). This information has been given by the provider (mail server 4; c.f. FIG. 4). And, it is inputted with input device 33 (c.f. FIG. 2). The password cannot be read except the user. Moreover, the user takes mail check ON/OFF information and mail address (sender mail address in the arrived electronic mail) from the destination information abstracter 30 (rule 30-1 of transfer request electronic mail shown in FIG. 3(*c*)). And, the user puts them in the areas 28-1 to 28-n shown in FIG. 3(*a*) of the mail server access unit 28. These operations are processed with the input device 33.

According to this mail check ON/OFF information of rule 30-1 of transfer request electronic mail, the server access unit 28 periodically inquires of the mail server 4 the arrival of electronic mails. If the mail server 4 is holding the electronic mails which has arrived from the source specified by the information, destination information abstracter 30 informs transfer controller 29 of it.

(2) The Overall Operation

Hereinafter, referring to FIG. 4, the overall operation will be described

According to FIG. 4, an electronic mail is sent from the communication terminal 3 of the sender. This mail has been given the address of the communication terminal 7 which the user usually use. This mail arrives at the mail server 4 via the communication network.

In the ordinary occasion, the network transfer communication device 6a does not play any role. In this occasion, the mail server informs the communication terminal 7 of the arrival of mail. Or the user at the communication terminal 7 voluntarily inquires of the mail server 4 whether any mail has arrived or not. Thus, the user notices the arrival of mail and transfers the mail to the communication terminal 7 so as to read the mail.

In the special occasion when the user is out, the network transfer communication device 6a plays a very important role. In this occasion, the user sends an electronic mail of demanding to transfer the mail arrived at the mail server 4. Acceding to this demand, the network transfer communication device 6a brings the mail from the mail server 4 with the confirmation of the mail address of the user. And, the mail is transferred to the communication terminal 5 of outside use so as to be read by the user who is out.

Figure 6A:
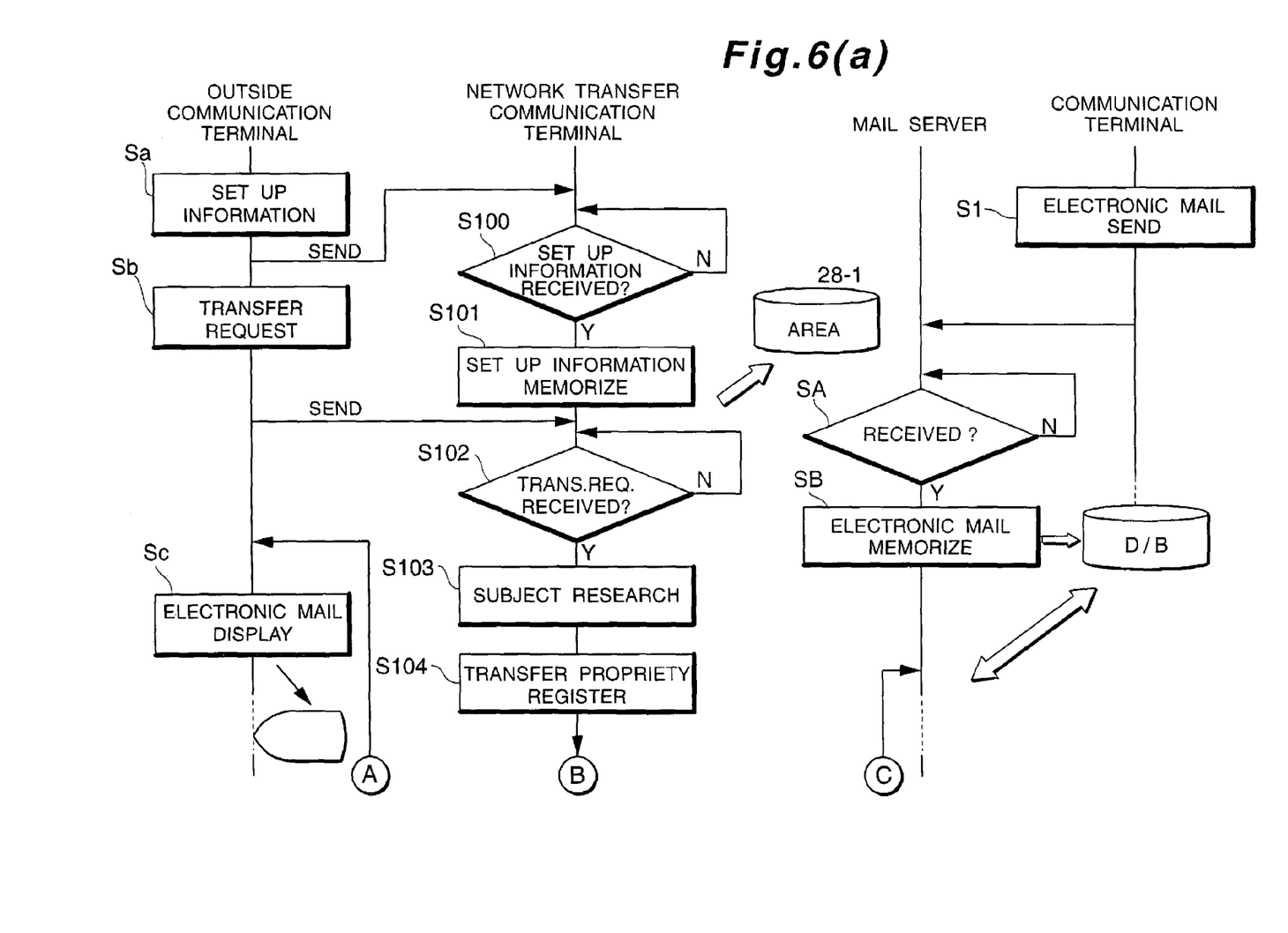
FIG. 6 is a sequence flow chart showing the overall operation of the first embodiment.
Figure 6B:
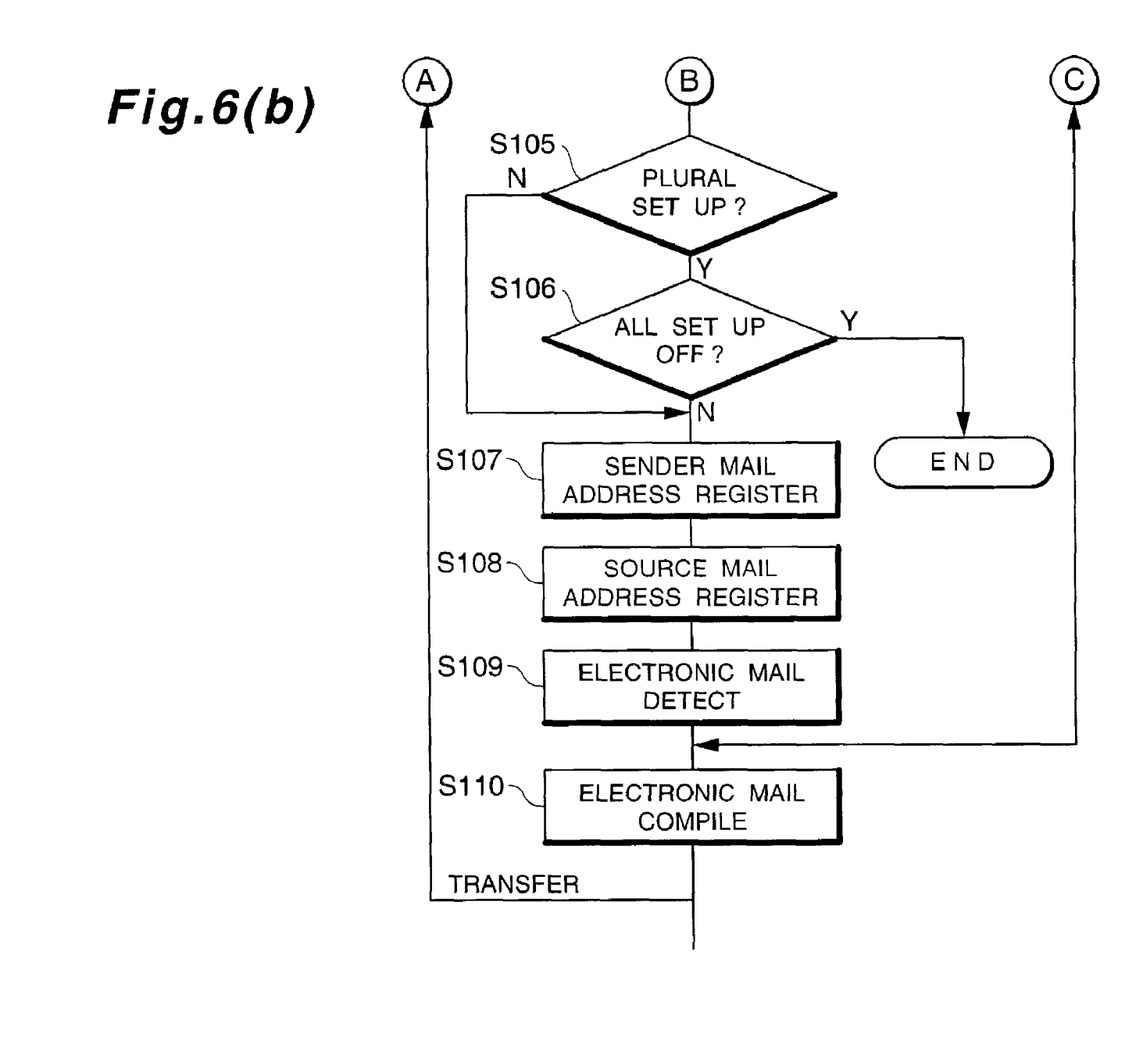

(3) Hereafter, the electronic mail transferring operation of the network transfer communication device 6a will be described with the reference of FIG. 6. In FIG. 6, at step S1, an electronic mail has been given the address of the communication terminal 7 which the user usually use. This mail is sent from the communication terminal 3 of the sender to the mail server 4 (c.f. FIG. 4). When this mail arrived and received (step SA), it is held by the database of the mail server 4 (step SB).

Next, the set up information is sent by the user from the communication terminal 5 of outside to the network transfer communication device 6a (step Sa). When this set up information arrived and received (step S100), it is memorized in the area 28-1 of the mail server access unit 28 (step S101).

As for an example of this set up information, the mail server name of the mail server 4 is "POP3@ghijk.co.jp", the account is "yu-abcdef" and password is "123456" set in advance (step Sa).

Figure 5:
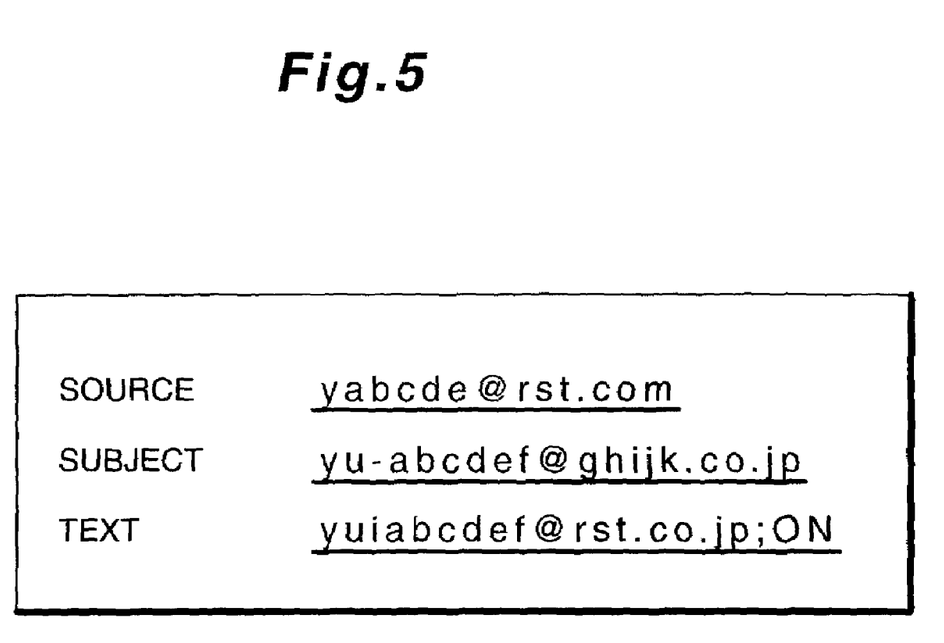
FIG. 5 is a block diagram showing an example of plural mail address used in the overall operation of the first embodiment.

And, when the user demands to transfer electronic mails which are given the same mail address "yu-abcdef@ghijk.co.jp", the user compiles such an electronic mail as shown in FIG. 5.

In FIG. 5, the communication terminal 5 has the mail address "yabcde@rst.com", the network transfer communication device 6a has the mail address "yu-abcdef@ghijk.co.jp", and the terminal 3 of the original sender has the mail address "yuiabcdef@rst.co.jp". And, the mail check is ON to validate mail transfer.

The communication terminal 5 sends this transfer request mail to the network transfer communication terminal 6a (step Sb). And, the network transfer communication terminal 6a receives this mail (step S102). After this step, destination information abstracter 30 researches the subject part of this mail (step S103). That is, it compares the subject with the mail address registered in the mail server access unit 28. When it was recognized that the same address as that registered in the mail server access unit 28 was written in the subject field of the mail, the destination information abstracter 30 registers the transfer propriety in the mail check area 28-1 of the mail server access unit 28, and in the transfer propriety memory 29-3 (step S104).

At next steps S105 and S106, each ON/OFF in the mail check area 28-1 to 28-n of the mail server access unit 28 will be researched. When plural destination mail addresses are registered for the source (step S105), it inquires whether all destination information registers are OFF or not (step S106). When all destination information registers are not OFF, it registers the original sender mail address included in the text of the electronic mail (c.f. FIG. 3), in the mail address register area 28-1 (step S107). And, further, it registers the mail address of transfer request PC (c.f. FIG. 3) in the destination address memory 29-2 of the transfer controller 29 (step S108).

After those registrations in the mail server access unit 28 and the transfer controller 29 have been processed by the destination information abstracter 30, the next step S109 is processed. If either mail check of the mail server access unit 28 is ON, the mail server access unit 28 checks the mail server 4 periodically (for example, each 5 minutes, 10 minutes, 30 minutes or 1 hour). By this checking process, it detects and holds electronic mails arrived from the registered mail address (step S109). And, the transfer controller 29 compiles an electronic mail for transfer (step S110). This mail is compiled from the information memorized in the source server information memory 29-1 or destination address memory 29-2. The network interface 27 sends this electronic mail by SMTP to the communication terminal 5 used outside. And, the communication terminal 5 displays this electronic mail for the user to read it (step Sc).

When there are not plural destination mail addresses registered at step S105, in other words, when there is single destination mail address registered and the mail check of this destination is ON, the network transfer communication terminal 6A proceeds to the step S107 and succeeding steps. And, it registers the mail address of the sender and processes succeeding steps.

Although, the mail address of the source is included in the subject field and the mail address of the sender is included in the text according to the transfer request electronic mail of this embodiment, the invention is not to be limited to this. The mail address of the source can be included in the text and the mail address of the sender can be included in the subject field. Further, these addresses can be included in any field of the mail format.

As described above, electronic mails of transfer request are sent by the user from the communication terminal 5 to the network transfer communication device 6A. By this mail, the electronic mail addressed to the user arrived at the mail server 4 are transferred to the communication terminal 5. In this transfer process, it has become needless to utilize the transfer service of ISP. Therefore, the total of transfer destinations (mail addresses) is not limited. And, the important point is that it has become needless to set the transfer information of the electronic mail addressed to the user in the borrowed communication device at client's office. So, the password or electronic mail's content does not leak out. And, electronic mails are never read by strangers.

In other words, the communication terminal 5 informs the network transfer communication device 6A of the information for getting access to the mail server 4 via electronic mail or facsimile. The communication terminal 5 itself never possesses the setting information for getting access to the mail server 4. Only the network transfer communication device 6A posses this information. And the network transfer communication device 6A gets access to the mail server 4 so as to receive the electronic mail. In this receiving process, the access to the mail server 4 is processed according to the setting information informed from the communication terminal 5 via electronic mail or facsimile. After this receiving process, the network transfer communication device 6A transfers the received electronic mail to the communication terminal 5 according to the transfer request information informed from the communication terminal 5. Thus, the communication terminal 5 itself does not need to get access to the mail server 4. Therefore, the communication terminal 5 itself does not need to register the setting information for receiving the electronic mail from the mail server 4.

Further, it has become to be able to transfer only mails which the user wants. So, the communication time has shortened. This would be convenient if the communication terminal 5 borrowed from clients is being connected by dialing, because the communication cost can be reduced as much as possible.

The Second Embodiment

<Configuration>

The overall configuration of this second embodiment is same as that of the first embodiment.

Hereinafter, the internal configuration of the network transfer communication device 6B in FIG. 1 according to the second embodiment will be described, referring to FIG. 7.

Figure 7:
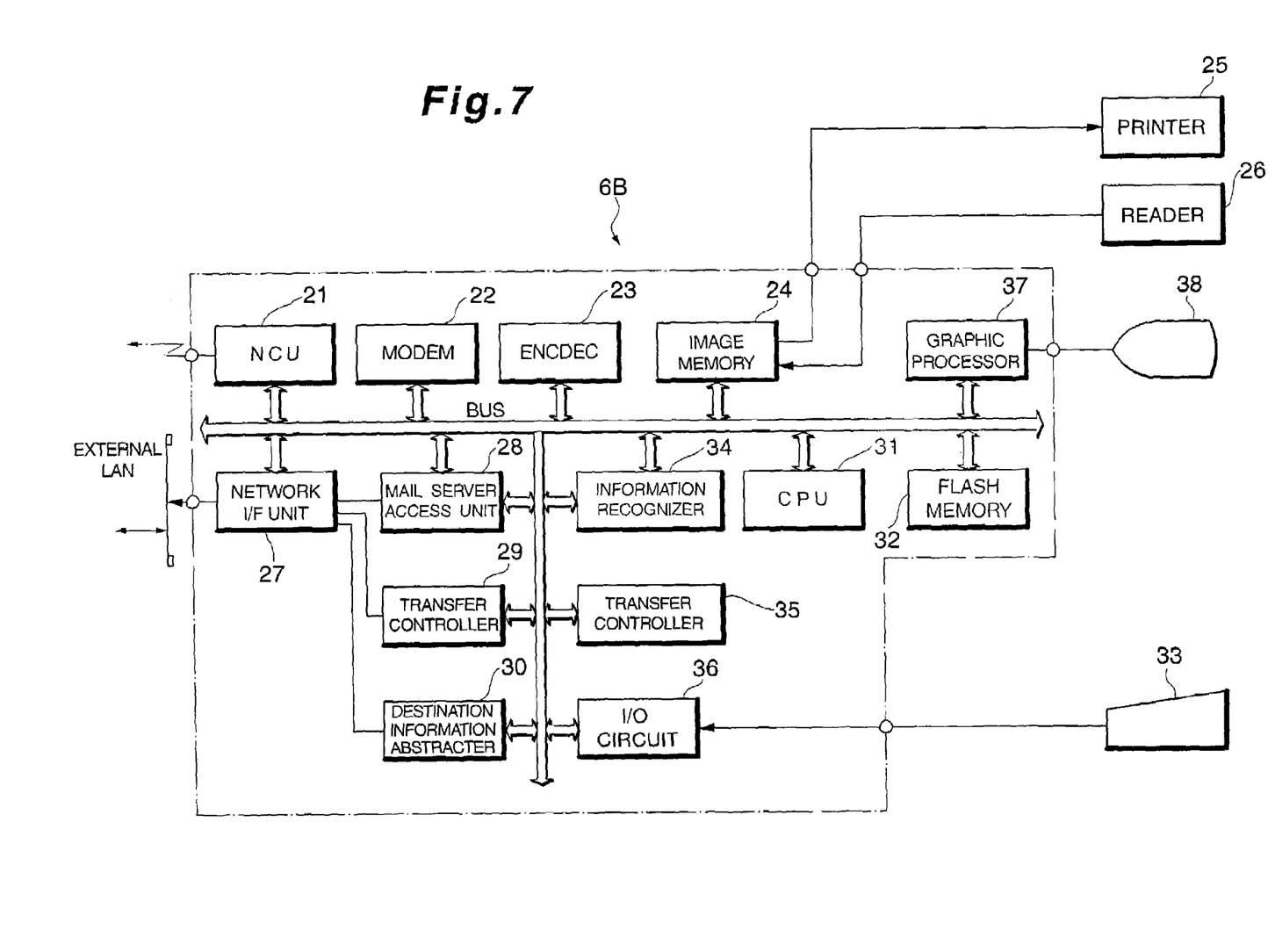
FIG. 7 is a block diagram showing the internal configuration of the network transfer communication device according to the second embodiment.

In FIG. 7, the network transfer communication device 6B has the same configuration as the network transfer communication device 6A shown in FIG. 2. And, further it comprises a information recognizer 34 of facsimile and a transfer controller 35 of facsimile. The information recognizer 34 abstracts the destination telephone number and the mail address of the original sender from the electronic mail transfer request document received via facsimile. The transfer controller 35 transforms the electronic mail detected by the information recognizer 34 into facsimile data. And, it sends the data via facsimile.

<Operation>

Next, the operation of the second embodiment will be described.

In this embodiment, the user makes use of a facsimile borrowed at the client's office. And, the user receives the electronic mail addressed to the user via facsimile to read the mail.

As going back to the first embodiment here, the electronic mail transfer request from outside is sent by the mailer application program in the communication terminal 5 borrowed from the client. In this sending process, practically a specific electronic mail is transferred to the mail account which belongs to the communication terminal 5 used by the client.

On the other hand, in the electronic mail transfer via facsimile, the user sends an electronic mail transfer request via facsimile to the network transfer communication device 6B. And, the network transfer communication device 6B transforms the electronic mail into facsimile data. After these processes, the network transfer communication device 6B sends the data via facsimile to the telephone number assigned in the client's office where the user sends transfer request.

Hereinafter, the electronic mail transfer operation by this facsimile communication will be described.

In FIG. 1 and FIG. 7, an electronic mail transfer request document of facsimile data arrives at the network transfer communication device 6B from the facsimile device not shown in the drawings. In the network transfer communication device 6B, the facsimile data (image data) is received by NCU 21 via the analog fixed communication network 1a. And, it is processed by MODEM 22 and ENCDEC 23 to memorize in the image memory 24. In this process, the image data is not printed out by the printer 25.

And, in the network transfer communication device 6B, the information recognizer 34 takes in the facsimile data of the electronic mail transfer request document out of the image memory 24 under the control of CPU 31. And, it abstracts the destination (client's office) telephone number and the mail address of the original sender. There are four methods of abstraction which are described hereinafter.

First, the information recognizer 34 abstracts the telephone number from TSI/CSI (transmitting subscriber identification/called subscriber identification) signal in facsimile transmission procedure (for example, G3 standardized format of ITU-T (international Telecommunication Union-Telecommunication Standardization Sector)/T.30 Recommendation).

Second, for example, destination telephone number, mail address of the original sender and so on are put in the available area in G3 standardized format of ITU-T/T.30 Recommendation so as to send via facsimile. And, from this signal, the information recognizer 34 abstracts destination telephone number, mail address of the original sender and so on.

In addition, facsimile transmission is not only processed under G3 standard of T.30 Recommendation. But it is also processed under G4 standard and so on. Third, the destination telephone number, mail address of the original sender and so on are written in the facsimile document. The information recognizer 34 abstracts destination telephone number, mail address of the original sender and so on by the character recognition method known well.

Fourth, a mail transfer request rule is established in advance. And, the information recognizer 34 recognizes the dual tone (two different frequency signal assigned to each DTMF/key) signal in push-button telephone formula of facsimile or telephone not described in the drawings, so as to abstract destination telephone number, mail address of the original sender and so on. The information recognizer 34 searches mail addresses registered in the mail server access unit 28 when it recognized mail transfer request data of facsimile document for access to the mail server 4. When it recognized the mail address registered, the information recognizer 34 registers mail server name, account of the mail server, password, mail check ON/OFF and specific mail address for transfer in the mail server access unit 28 (area 28-1 to 28-n) as well as the first embodiment. However, it uses the method either of the four methods mentioned above instead of the method of the first embodiment. And, the destination of this embodiment is telephone number which the user uses at the client's office. The information recognizer 34 registers the telephone number of facsimile in the transfer controller 35. By these processes, the registration in the mail server access unit 28 and the transfer controller 35 is finished. The mail check process about the mail server 4 which mail check is set ON is same as the first embodiment. Moreover, specific mail address for transfer can be omitted. In this occasion, all the mail addressed to the user are transferred. This is same as the first embodiment, too. That is, the network transfer communication device 6B checks the mail server 4 by the mail server access unit 28 periodically (for example, every 5 minutes, 10 minutes, 30 minutes or 1 hour). When the mail server access unit 28 detected an electronic mail which has given the mail address of the user, the transfer controller 35 transforms this electronic mail into facsimile data.

This facsimile data is sent via facsimile to the destination facsimile telephone number registered by the mail transfer request document. This facsimile transmission is processed by the transmission procedure T.30 of ITU-T standard G3 formula known well. That is, this procedure comprises handshaking with transmission character by training signal. Further description is omitted, because the art is known well.

<Additional Remarks>

As additionally remarked, when electronic mails are sent via facsimile, it is possible to adopt the formula of transforming only text file into facsimile data for transfer. In this occasion, only character codes are transferred. What is called control codes (line changing or character end mark/character code can be ASCII or Unicode and so on) is not sent. Moreover, it is possible to transform only appended file of format known well into facsimile data for transfer. Such files are compressed image data of stills (for example, JPEG (joint photographic experts group) by ITU-T standardization), image file (for example, TIFF: tagged image file format) and so on.

Thus, in the second embodiment, even if the user could not borrow the communication device which can process electronic mail communication, he or she is able to receive and read the electronic mails at the client's office. Because the electronic mails can be transferred from ISP via facsimile in facsimile transmission procedure.

In addition, the network transfer communication devices 6A, 6B in the first and second embodiments, comprise to be separated from the mail server 4 connected to the communication network. But, it is possible to combine the network transfer communication device 6A or 6B with the mail server 4 at the same site.

The present invention can be embodied in the communication system and communication device which are able to receive mails without mail server 4.

What is claimed is:

1. A network transfer communication device which transfers electronic information from a first communication device to a second communication device, the network transfer communication device comprising:
   an information abstracting means to abstract communication condition information from the transfer request information received from said second communication device,
   a communication condition setting means to set communication condition according to the information abstracted by said information abstracting means,
   an electronic information receiving means to receive said electronic information from said first communication device according to the setting condition set in said communication condition setting means, and
   a communication controlling means to execute communication control for transferring said electronic information to said second communication device according to the condition set in said communication condition setting means,
   wherein said communication condition contains a valid/invalid setting which indicates whether said electronic information receiving means is allowed to search said first communication device for receiving said electronic information, and if said valid/invalid setting is a valid setting indicating that said electronic information receiving means is allowed, said electronic information receiving means performs a receiving operation to receive said electronic information.

2. A network transfer communication device according to claim 1 wherein
   said electronic information receiving means periodically detects said electronic information, and
   said communication controlling means transfers said electronic information to said second communication device.

3. A network transfer communication device according to claim 1 wherein
   said communication controlling means has:
      a destination address memory to hold destination information as communication condition information registered in said information abstracting means, and
      a transfer propriety memory to hold information indicating transfer propriety of said electronic information.

4. A network transfer communication device according to claim 1 wherein said information abstracting means abstract at least
   information of the transfer request sender,
   electronic information transfer source, and
   electronic mail sender.

5. A network transfer communication device according to claim 1 wherein
   said electronic information is an electronic mail information,
   said communication condition information abstracted by said information abstracting means is an information of electronic mail transfer, and
   said communication control processed by said communication controlling means is a communication control by electronic mail transfer operation.

6. A network transfer communication device according to claim 1 wherein
   said electronic information is an electronic mail information,
   said communication condition information abstracted by said information abstracting means is an information of facsimile transmission, and
   said communication control processed by said communication controlling means is a communication control by facsimile transmission operation which transfers said electronic mail as facsimile data.

7. A network transfer communication system where electronic information is transferred from a first communication device to a second communication device, the network transfer communication system comprising:
   an information abstracting means to abstract communication condition information from the transfer request information received from said second communication device,
   a communication condition setting means to set communication condition according to the information abstracted by said information abstracting means,
   an electronic information receiving means to receive said electronic information from said first communication device according to the setting condition set in said communication condition setting means, and
   a communication controlling means to execute communication control for transferring said electronic information to said second communication device according to the condition set in said communication condition setting means,
   wherein said communication condition contains a valid/invalid setting which indicates whether said electronic information receiving means is allowed to search said first communication device for receiving said electronic information, and if said valid/invalid setting is a valid setting indicating that said electronic information receiving means is allowed, said electronic information receiving means performs a receiving operation to receive said electronic information.

8. A network transfer communication system according to claim 7 wherein said electronic information receiving means periodically detects said electronic information, said communication controlling means transfers said electronic information to said communication device, and said electronic information receiving means searches said first communication device for receiving said electronic information in a predetermined cycle.

9. A network transfer communication system according to claim 7 wherein said communication controlling means has:

a destination address memory to hold destination information as communication condition information registered in said information abstracting means, and a transfer propriety memory to hold information indicating transfer propriety of said electronic information.

10. A network transfer communication system according to claim 7 wherein said information abstracting means abstract at least information of the transfer request sender, electronic information transfer source, and electronic mail sender.

11. A network transfer communication system according to claim 7 wherein said electronic information is an electronic mail information, said communication condition information abstracted by said information abstracting means is an information of electronic mail transfer, and said communication control processed by said communication controlling means is a communication control by electronic mail transfer operation.

12. A network transfer communication system according to claim 7 wherein said electronic information is an electronic mail information, said communication condition information abstracted by said information abstracting means is an information of facsimile transmission, and said communication control processed by said communication controlling means is a communication control by facsimile transmission operation which transfers said electronic mail as facsimile data.

13. A transfer method for network transfer communication device which transfers electronic mail information from a first communication device to a second communication device, the transfer method comprising:

an information abstracting process for abstracting electronic mail transfer setting information from the transfer request information received from said second communication device, a communication condition setting process for setting communication condition according to the information abstracted by said information abstracting process, an electronic mail information receiving process for receiving said electronic mail information from said first communication device according to the setting condition set by said communication condition setting process, and a communication controlling process for executing communication control for transferring said electronic mail information to said second communication device according to the condition set by the communication condition setting process, wherein said communication condition contains a valid/invalid setting which indicates whether said electronic information receiving means is allowed to search said first communication device for receiving said electronic information, and if said valid/invalid setting is a valid setting indicating that said electronic information receiving means is allowed, said electronic information receiving means performs a receiving operation to receive said electronic information.

14. A transfer method for network transfer communication device which transfers electronic mail information from a first communication device to a second communication device, the transfer method comprising:

an information abstracting process for abstracting facsimile transmission setting information from the transfer request information received from said second communication device, a communication condition setting process for setting communication condition according to the information abstracted by said information abstracting process, an electronic mail information receiving process for receiving said electronic mail information from said first communication device according to the setting condition set by said communication condition setting process, and a communication controlling process for executing communication control for transferring said electronic mail information as facsimile data to said second communication device according to the condition set by the communication condition setting process, wherein said communication condition contains a valid/invalid setting which indicates whether said electronic information receiving means is allowed to search said first communication device for receiving said electronic information, and if said valid/invalid setting is a valid setting indicating that said electronic information receiving means is allowed, said electronic information receiving means performs a receiving operation to receive said electronic information.

15. A transfer program executed by a processor which transfers electronic information from a first communication device to a second communication device, the transfer program comprising:

an information abstracting process for abstracting communication condition information from the transfer request information received from said second communication device, a communication condition setting process for setting communication condition according to the information abstracted by said information abstracting process, an electronic information receiving process for receiving said electronic information from said first communication device according to the setting condition set by said communication condition setting process, and a communication controlling process for executing communication control for transferring said electronic information to said second communication device according to the condition set by the communication condition setting process, wherein said communication condition contains a valid/invalid setting which indicates whether said electronic information receiving means is allowed to search said first communication device for receiving said electronic information, and if said valid/invalid setting is a valid setting indicating that said electronic information receiving means is allowed, said electronic information receiving means performs a receiving operation to receive said electronic information.

16. The network transfer communication device according to claim 1, wherein said first communication device is one of a plurality of servers, and the plurality of servers are registered.

17. The network transfer communication device according to claim 1, wherein said electronic information receiving means uses a password to receive said electronic information, and said password is registered.

18. The network transfer communication device according to claim 1, wherein
said electronic information contains respective electronic data that corresponds to a plurality of data transmitting sources, and
said communication condition contains an article that specifies said plurality of data transmitting sources.

19. The network transfer communication device according to claim 18, wherein said communication condition further contains respective ON/OFF selection settings to correspond to said plurality of data transmitting sources, each ON/OFF selection setting indicates whether the corresponding data transmitting source should be specified.

20. The network transfer communication device according to claim 19, wherein said network transfer communication device only receives electronic information that meets said communication condition from said electronic information in said first communication device.

21. The network transfer communication device according to claim 1, wherein said information abstracting means abstracts said transfer request information from a received facsimile data or a received telephone signal.

22. The network transfer communication device according to claim 7, wherein said first communication device is one of a plurality of servers, and the plurality of servers are registered.

23. The network transfer communication device according to claim 7 wherein said electronic information receiving means uses a password to receive said electronic information, and said password is registered.

24. The network transfer communication device according to claim 7 wherein said electronic information contains respective electronic data that corresponds to a plurality of data transmitting sources, and
said communication condition contains an article that specifies said plurality of data transmitting sources.

25. The network transfer communication device according to claim 24, wherein said communication condition further contains respective ON/OFF selection settings to correspond to said plurality of data transmitting sources, each ON/OFF selection setting indicates whether the corresponding data transmitting source should be specified.

26. The network transfer communication device according to claim 25, wherein said network transfer communication device only receives electronic information that meets said communication condition from said electronic information in said first communication device.

27. The network transfer communication device according to claim 1, wherein said information abstracting means abstracts said transfer request information from a received facsimile data or a received telephone signal.

* * * * *